United States Patent
Ishibashi et al.

(10) Patent No.: US 6,522,607 B1
(45) Date of Patent: Feb. 18, 2003

(54) RECORDING DEVICE AND METHOD, DECODING DEVICE AND METHOD, PROVIDING MEDIUM, AND INFORMATION RECORDING MEDIUM

(75) Inventors: Yoshihito Ishibashi, Tokyo (JP); Tomoyuki Asano, Kanagawa (JP); Izuru Kitamura, Tokyo (JP); Jun Kitahara, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/555,849

(22) PCT Filed: Oct. 5, 1999

(86) PCT No.: PCT/JP99/05471

§ 371 (c)(1),
(2), (4) Date: Jun. 5, 2000

(30) Foreign Application Priority Data

Oct. 5, 1998 (JP) .......................................... 10-282226

(51) Int. Cl.$^7$ ............................................... G11B 7/00
(52) U.S. Cl. ................. 369/47.1; 369/47.12; 369/53.21
(58) Field of Search ........................... 369/47.12, 47.19, 369/47.1

(56) References Cited

U.S. PATENT DOCUMENTS 6,083,667 A * 7/2000 Nishizawa et al. ...... 369/275.3
6,266,299 B1 * 7/2001 Oshima et al. ................ 369/13

FOREIGN PATENT DOCUMENTS

JP          9-128301      *  5/1997   ............... 369/275.3

* cited by examiner

Primary Examiner—Nabil Hindi
(74) Attorney, Agent, or Firm—Jay H. Maioli (57) ABSTRACT

Coded information can be utilized by devices other than a device supplied with information while preventing a dishonest use of the information, mutual recognizing part 17 mutually recognizes the IC card 4. The coding part 15 codes a key for contents with a key for movement. The recording part 12 records coded contents and the key for contents coded by the coding part 15 on the optical disc 5.

11 Claims, 10 Drawing Sheets

RECORDING DEVICE AND METHOD, DECODING DEVICE AND METHOD, PROVIDING MEDIUM, AND INFORMATION RECORDING MEDIUM

TECHNICAL FIELD

This present invention relates to a recording device and method, a decoding device and method, a providing medium, and an information recording medium, and more particularly, relates to a recording device and method, decoding device and method, providing medium, and information recording medium which utilizes coded information.

BACKGROUND ART

A system has been provided, in which information such as music is coded so as to prevent it from being used dishonestly and is transmitted to an information processing device of a user and the user decodes and reads out the information with the information processing device. In general, a user registers data specifying an information processing device which modifies information when contacting with an information provider. The information provider codes and provides information so that only the registered device can treat it.

The information to be supplied in such a system can not be utilized by other reading-out devices of the user who has the predetermined contact which allows him to read out information without limit.

DISCLOSURE OF INVENTION

The present invention has been made in view of the aforesaid problems, and its purpose is that coded information can be utilized by devices other than a device which is supplied with information, while preventing the information from being used dishonestly.

A recording device according to the present invention comprises a mutual recognizing means for mutually recognizing an information storing medium, a coding means for coding a first key with a second key read out from the information storing medium based on the mutual recognition of the mutual recognizing means, and a recording means for recording coded information and the first key coded by the coding means into a recording medium.

A recording method according to the present invention comprises a mutual recognizing step of mutually recognizing an information storing medium, a coding step of coding a first key with a second key read out from the information storing medium based on the mutual recognition of the mutual recognizing step, and a recording step of recording the coded information and the first key coded by the coding step into a recording medium.

A providing medium provides programs which can be read by a computer which makes a recording device execute processing including a mutual recognizing step of mutually recognizing with an information storing medium, a coding step of coding a first key with a second key read out from the information storing medium based on the mutual recognition of the mutual recognizing step, and a recording step of recording the coded information and the first key coded by the coding step into a recording medium.

The decoding device according to the present invention comprises a first decoding means for decoding a key read out from a recording medium, and a second decoding means for decoding coded information with the key decoded by the first decoding means.

A decoding method according to the present invention comprises a first decoding step of decoding a key read out from a recording medium, and a second decoding step of decoding coded information with the key decoded by the first decoding step.

A providing medium according to the present invention provides programs which can be read by a computer which makes a decoding device execute processing including a first decoding step of decoding a key read out from a recording medium and a second decoding step of decoding coded information with the key decoded by the first decoding step.

An information storing medium according to the present invention comprises a mutual recognizing means for mutually recognizing a recording device or a decoding device and a storing means for storing a second key for coding or decoding a first key which is used to decode coded information.

The recording device according to the present invention, the recording method according to the present invention, and the providing medium according to the present invention each mutually recognizes the information storing medium, and codes a first key with a second key read out from the information storing medium based on the mutual recognition, and records coded information and a coded first key in a recording medium.

The decoding device according to the present invention, the decoding method according to the present invention, and the providing medium according to the present invention each decode a key read out from the recording medium and decode coded information with the decoded key.

In the information storing medium according to the present invention, the mutual recognizing means mutually recognizes a recording device or a decoding device and the storing means stores a second key for coding or decoding a first key which is used to decode coded information.

BEST MODE FOR CARRYING OUT THE INVENTION

Hereinafter, an embodiment of the present invention will be described. But before that, the characteristics of the present invention will be described by showing the corresponding part in a parentheses following each means so as to describe a clear relation between each means of the invention written in the claims and the following embodiment. However, of course, this description is not intended to limit each means to the shown part.

That is, the recording device has a mutual recognizing means (for example, a mutual recognizing part 17 in FIG. 1) for mutually recognizing an information storing medium, coding means (for example, a coding part 15 in FIG. 1) for coding a first key with a second key read out from the information storing medium based on the mutual recognition of the mutual recognizing means, and recording means (for example, the recording part 12 in FIG. 1) for recording coded information and the first key coded by the coding means in a recording medium.

The decoding device has first decoding means (for example, a decoding part 32 in FIG. 1) for decoding a key read out from a recording medium, and second decoding means (for example, a decoding part 33 in FIG. 1) for decoding coded information with the key decoded by the first decoding means.

The information storing medium has mutual recognizing means (for example, a mutual recognizing part 22 in FIG. 1) for mutually recognizing with a recording device or a decoding device, and a storing means (for example, a storing part 21 in FIG. 1) for storing a second key for coding or decoding a first key which is used to decoded coded information.

Figure 1:
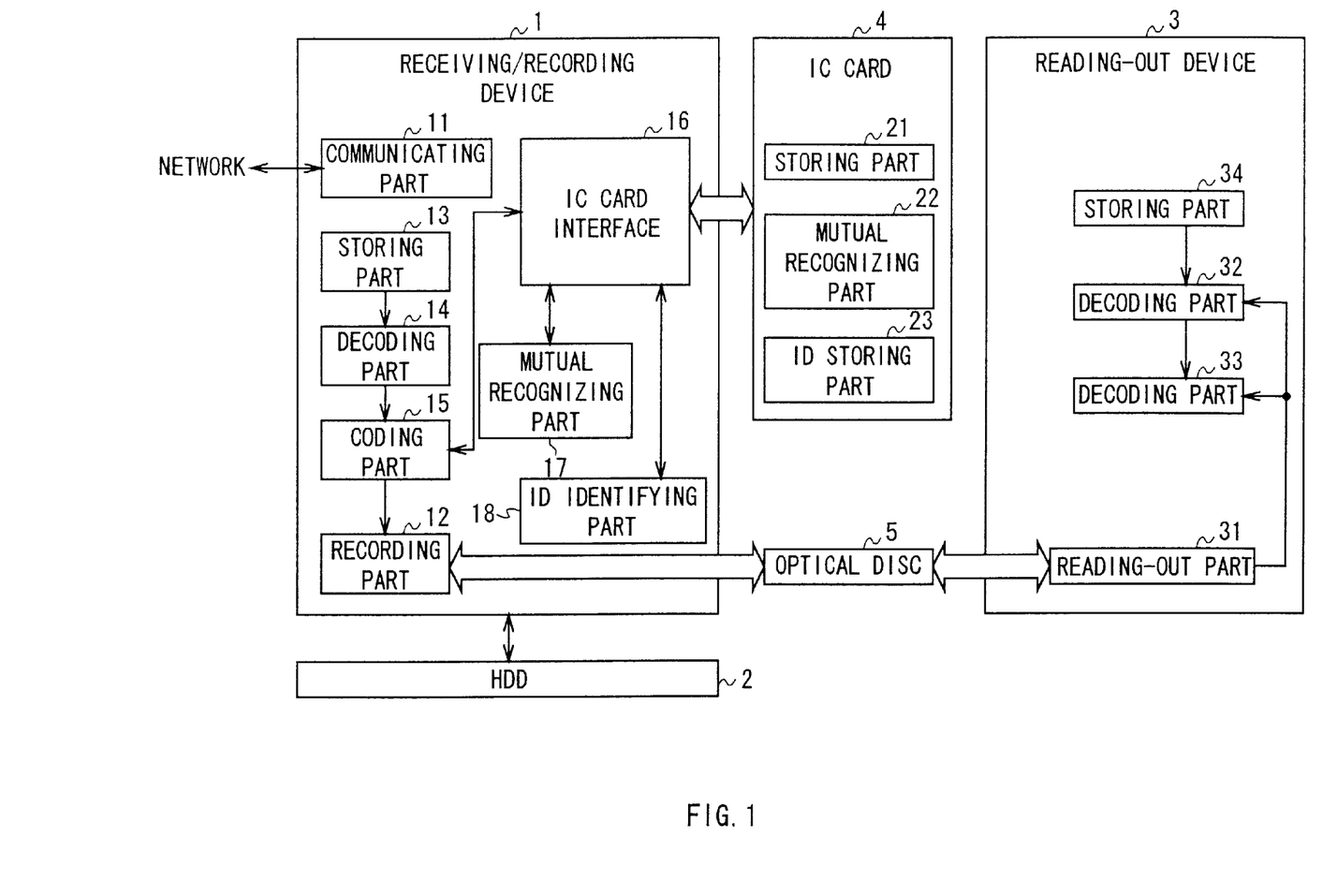
FIG. 1 is a block diagram explaining the configuration of the recording/read-out system.

FIG. 1 is a block diagram explaining the configuration of the recording/reading-out system as one example of the present invention. The receiving/recording device 1 is connected to a network which provides information (hereinafter, referred to as contents) such as music, pictures, programs, games, still images, and letters which have been coded with a common key-coding method such as the DES (Data Encryption Standard). Here, the network is composed of Internet, cable network, satellite, and so on. The receiving/recording device 1 transmits and receives information via an HDD 2 recording therein contents, which has been coded using a key for contents Kcon with a common key-coding method such as DES, and the key for contents Kcon coded with a key for storage Ks, through a predetermined bus. The receiving/recording device 1, having an optical disc 5 inserted therein, records predetermined data such as coded contents on the inserted optical disc 5, or having an IC card 4 inserted therein, reads out predetermined data stored by the IC card 4.

The DES as the common key-coding method of coding contents is a coding method which uses a common key comprised of 56 bits and processes a sentence with 64 bits as one block. The processing of the DES comprises a part (data mixing part) for reforming the sentence into a coded sentence through mixing, and a part (key processing part) for generating a key (enlarging key) used by the data mixing part from the common key. Since all algorithms of DES have been disclosed already, the basic processing of the data mixing part will be explained simply here.

At first, the 64 bits of sentences can be divided into a higher 32 bits $H_0$ and the lower 32 bits $L_0$. The enlarging key $K_1$ comprised of 48 bits supplied from the key processing part and the lower 32 bits $L_0$ are input and the output obtained by mixing the lower 32 bits $L_0$ by the F function is calculated. The F function is composed of two fundamental conversions: "value rearrange" for rearranging values with a predetermined rule; and "replacing" for replacing bit positions with a predetermined rule. Next, the higher 32 bits $H_0$ and the output of the F function are subjected to the exclusive or. And the resultant is set to the lower 32 bits $L_1$. The lower 32 bits $L_0$ is set to the higher 32 bits $H_1$.

The above processing is repeated sixteen times based on the higher 32 bits $H_0$ and the lower 32 bits $L_0$. The obtained higher 32 bits $H_{16}$ and the lower 32 bits $L_{16}$ are output as a coded sentence. The decoding is executed using the common key used in coding through the reverse of the above processing.

A communicating part 11 transmits/receives information to/from a network. The recording part 12, when the optical disc 5 is inserted therein, records information which is supplied from the coding part 15 or the HDD 2 on the inserted optical disc 5. A storing part 13 stores the key for storage Ks which is used to decode the key for contents Kcon. A decoding part 14 decodes the key for contents Kcon, which is being recorded in the HDD 2, with the key for storage Ks which is stored by the storing part 13. The coding part 15 codes the key for contents Kcon decoded by the decoding part 14, with the key for movement Kt supplied from an IC card 4 through the IC card interface 16. Here, the key for storage Ks is an individually different special key for every receiving/recording device and the key for movement Kt is an individually different special key for every IC card.

The IC card interface 16 changes predetermined data, which is supplied from the IC card 4 inserted into the receiving/recording device 1, into data of a predetermined form, and then outputs it to the coding part 15, an ID identifying part 18, or the mutual recognizing part 17. Further, it changes the predetermined data supplied from the coding part 15, the ID identifying part 18, or the mutual recognizing part 17 into data of a predetermined form, and outputs it to the inserted IC card 4. The mutual recognizing part 17 mutually recognizes the IC card 4 through the IC card interface 16 by the procedure using common key coding, such as the DES, described later. The ID (Identification Data) identifying part 18 identifies the IC card 4 based on the special ID of the IC card 4 supplied from the IC card 4 through the IC card interface 16.

The IC card 4 stores the special ID of the readout device 3 so as to have a connection with the device 3. In addition, the reading-out device 3 is removable from the receiving/recording device 1, and when being attached to the receiving/recording device 1, supplies the special ID of the corresponding reading-out device 3 to make the device 1 identify the IC card 4, and performs the mutual recognition and supplies the key for movement Kt. The IC card 4 includes the storing part 21, the mutual recognizing part 22, an ID storing part 23. The storing part 21 is composed of a ROM (Read Only Memory), a nonvolatile memory (EEPROM (Electric Erasable Program ROM)), a flash memory, a FRAM (trademark) (Ferroelectric Random Access Memory) etc.), and stores the key for movement Kt. The mutual recognizing part 22 mutually recognizes the receiving/recording device 1 through the IC card interface 16 through the procedure using the common key coding, such as the DES, described later. The ID storing part 23 is composed of a ROM and stores a special ID of the reading-out device 3 which corresponds to the IC card 4.

The reading-out device 3 which is not connected to the receiving/recording device 1 through a bus and network, which for example, is attached to a car or is brought by a user, is composed of a reading-out part 31, the decoding part 32, the decoding part 33, and a storing part 34. The reading-out part 31, when the optical disc 5 recording coded contents and the key for contents Kcon is inserted in the receiving/recording device 1, reads out the contents and the key for contents Kcon recorded on the optical disc 5. The decoding part 32 decodes the key for contents Kcon read out from the optical disc 5 by the reading-out part 31, with the key for movement Kt stored by the storing part 34 and supplies the decoded key for contents Kcon to the decoding part 33. The decoding part 33 decodes the contents read out from the optical disc 5 by the reading-out part 31 with the key for contents Kcon supplied from the decoding part 32. The storing part 34 stores the same key for movement Kt as that stored in the storing part 21 of the IC card 4.

The HDD 2 is connected to the receiving/recording device 1 through the bus, and records the contents coded with the key for contents Kcon with the common key-coding method such as the DES and the key for contents Kcon coded with the key for storage Ks.

Figure 2:
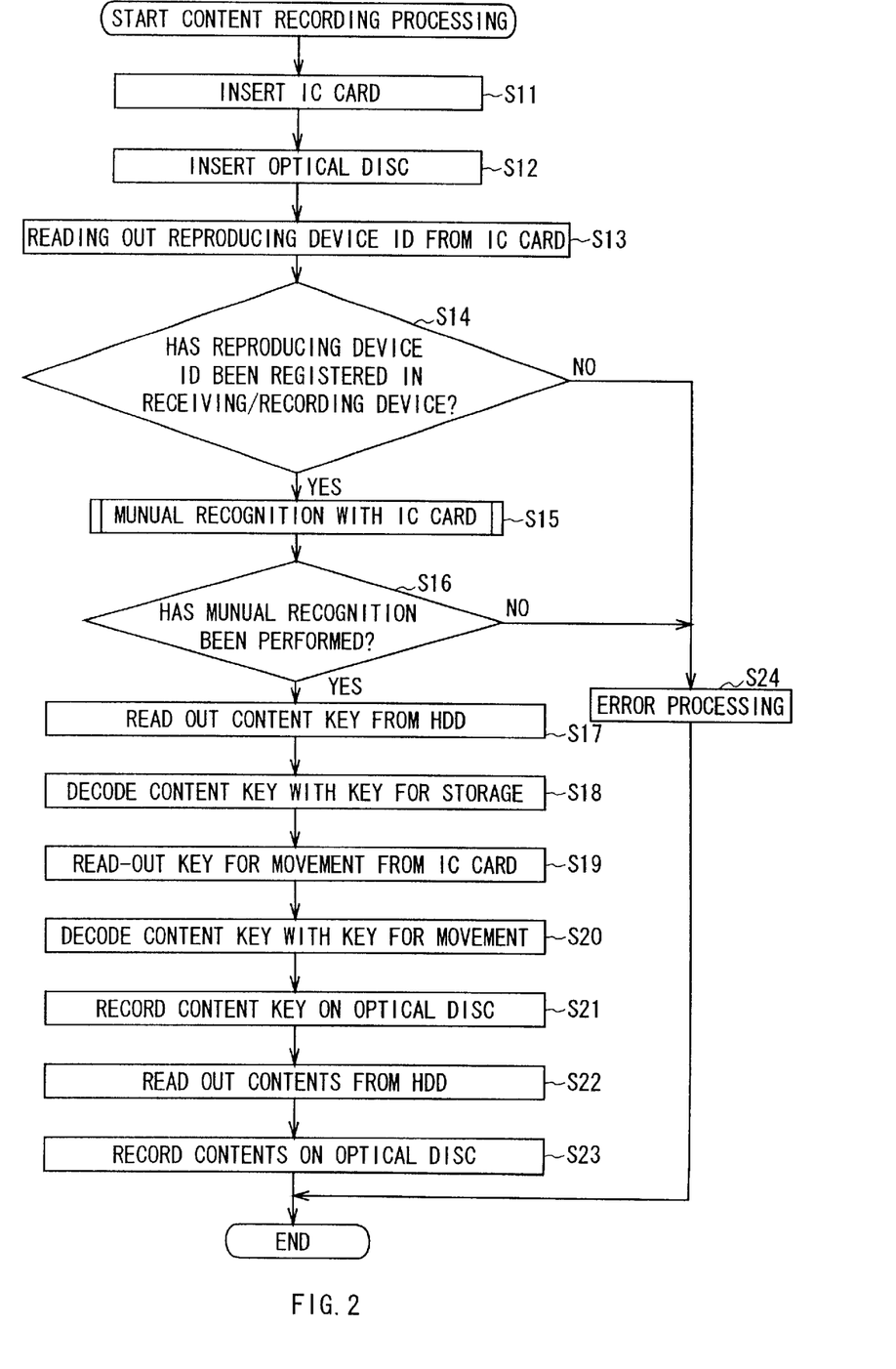
FIG. 2 is a flowchart explaining processing of recording contents and something being recorded in an HDD 2 on an optical disc 5 in a receiving/recording device 1.

Next, the processing of recording contents and the like being recorded in the HDD 2 on the optical disc 5 in the receiving/recording device 1 will be described with reference to the flowchart in FIG. 2. At step S11, the IC card 4 is inserted in the IC card interface 16 of the receiving/recording device 1. At step S12, the optical disc 5 is inserted in the recording part 12 of the receiving/recording device 1. At step S13, the ID identifying part 18 of the receiving/recording device 1 reads out the ID of the read-out device 3 stored in the ID storing part 23 of the IC card 4 through the IC card interface 16. At step S14, the ID identifying part 18 of the receiving/recording device 1 judges whether the ID read out from the ID storing part 23 of the ID card 4 has been registered with the ID identifying part 18. When it is judged that the ID has been registered with the ID identifying part 18, the process proceeds to step S15 in which the mutual recognizing part 17 mutually recognizes the mutual recognizing part 22 of the IC card 4. The processing of the mutual recognition will be described later in detail with reference to a flowchart of FIG. 3.

At step S16, the mutual recognizing part 17 judges whether it could mutually recognize the IC card 4 at step S15. When it is judged that the part 17 could mutually recognize the IC card 4, the process proceeds to step SP17 in which the decoding part 14 reads out a key for contents Kcon coded with a key for storage Ks, from the HDD 2. At step SP18, the decoding part 14 decodes the coded key for contents Kcon read out, with the key for storage Ks stored in the storing part 13, and supplies the decoded key for contents Kcon to the decoding part 15.

At step S19, the decoding part S15 reads out a key for movement Kt stored in the storing part 21 of the IC card 4 through the IC card interface 16. At step S20, the coding part 15 codes the decoded key for contents Kcon with the key for movement Kt again and supplies the coded key for contents Kcon to the recording part 12. At step S21, the recording part 12 records the key for contents Kcon coded with the key for movement Kt on the optical disc 5. At step S22, the recording part 12 reads out contents coded with the key for contents Kcon, from the HDD 2. At step S23, the recording part 12 records the contents read out at step S22 on the optical disc 5 and the processing is completed.

If it is judged at step S14 that the ID read out from the ID storing part 23 of the ID card 4 has not been registered with the ID identifying part 18, and if it is judged at step S16 that the mutual recognition was not performed with the IC card 4, the processing proceeds to step S24 in which the ID identifying part 18 or the mutual recognizing part 17 executes predetermined error processing such as displaying a predetermined error message on a display, and then the processing is completed.

As described above, the receiving/recording device 1 records contents coded with the key for contents Kcon and the key for contents Kcon coded with the key for movement Kt on the optical disc 5.

Figure 3:
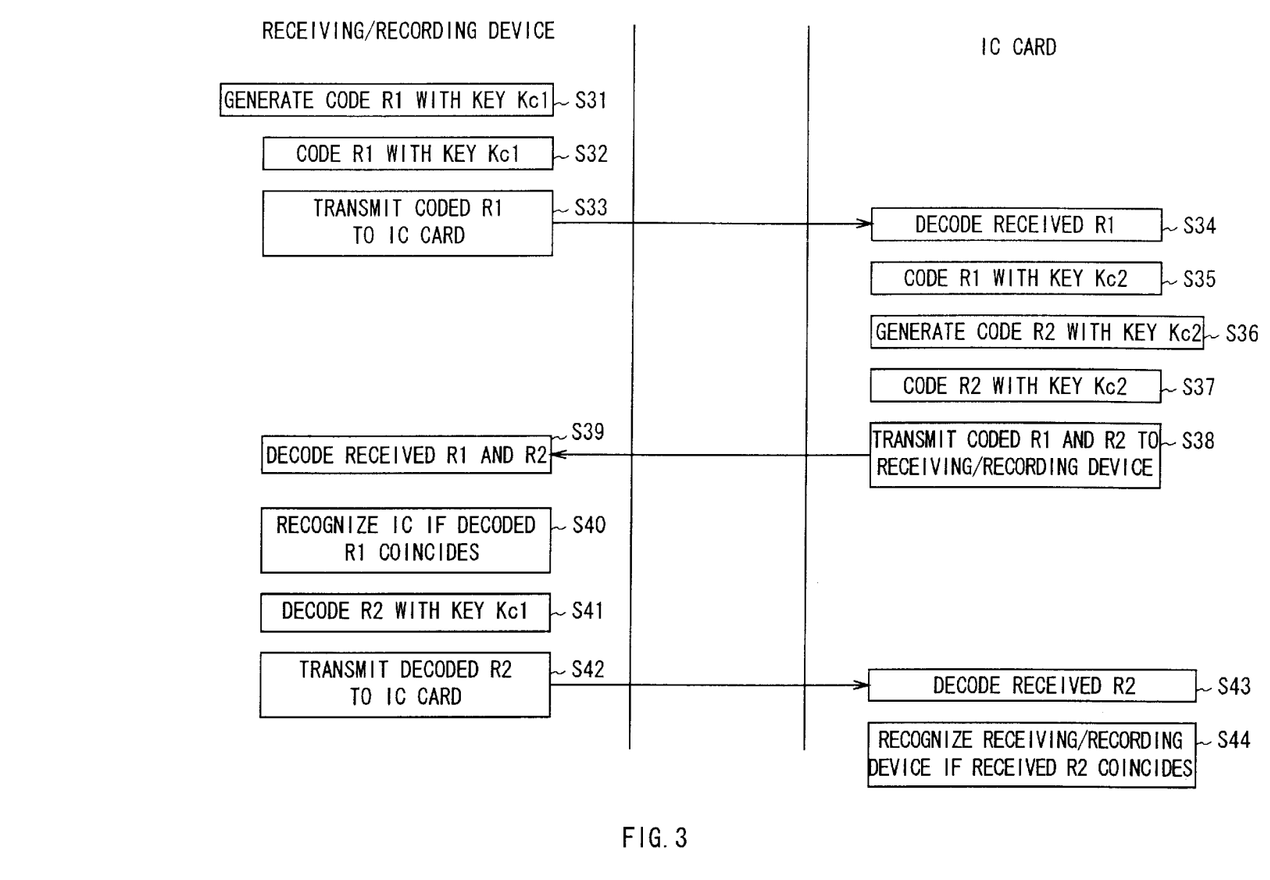
FIG. 3 is a flowchart explaining the detail of mutual recognition processing between the receiving/recording device 1 and an IC card 4.

Next, the mutual recognizing processing between the receiving/recording device 1 and the IC card 4, which corresponds to step S15 in FIG. 2 and is performed using DES common key coding with two common keys Kc1 and Kc2, will be described with reference to the flowchart of FIG. 3. At step S31, the mutual recognizing part 17 of the receiving/recording device 1 generates a random number R1 comprised of 64 bits. At step S32, the mutual recognizing part 17 of the receiving/recording device 1 codes the random number R1 with the previously stored common key Kc1. At step S33, the mutual recognizing part 17 of the receiving/recording device 1 transmits the coded random number R1 to the mutual recognizing part 22 of the IC card 4.

At step S34, the mutual recognizing part 22 of the IC card 4 decodes the received random number R1 with the previously stored common key Kc1. At step S35, the mutual recognizing part 22 of the IC card 4 codes the random number R1 with the previously stored common key Kc2. At step S36, the mutual recognizing part 22 of the IC card 4 generates a random number R2 comprised of 64 bits. At step S37, the mutual recognizing part 22 of the IC card 4 codes the random number R2 with the common key Kc2. At step S38, the mutual recognizing part 22 of the IC card 4 transmits the coded random numbers R1 and R2 to the mutual recognizing part 17 of the receiving/recording device 1.

At step S39, the mutual recognizing part 17 of the receiving/recording device 1 decodes the received random numbers R1 and R2 with the previously stored common key Kc2. At step S40, the mutual recognizing part 17 of the receiving/recording device 1 checks the decoded random number R1 with the random number R1 (random number R1 before coding) generated at step S31. When it judges that they are the same, the IC card 4 is recognized as a proper IC card, otherwise when it judges that they are not the same, the IC card 4 is recognized as a dishonest one and the processing is completed. At step S41, the mutual recognizing part 17 of the receiving/recording device 1 codes the decoded random number R2 with the common key Kc1. At step S42, the mutual recognizing part 17 of the receiving/recording device 1 transmits the coded random number R2 to the mutual recognizing part 22 of the IC card 4.

At step S43, the mutual recognizing part 22 of the IC card 4 decodes the received random number R2 with the common key Kc1. At step S44, the mutual recognizing part 22 of the IC card 4 recognizes the receiving/recording device 1 as a proper receiving/recording device if it is judged at step S36 that the decoded random number R2 is the same as the random number R2 (random number R2 before coding) generated at step S36. Otherwise, if it is not the same, the receiving/recording device 1 is recognized as a dishonest receiving/recording device and the processing is completed.

Figure 4:
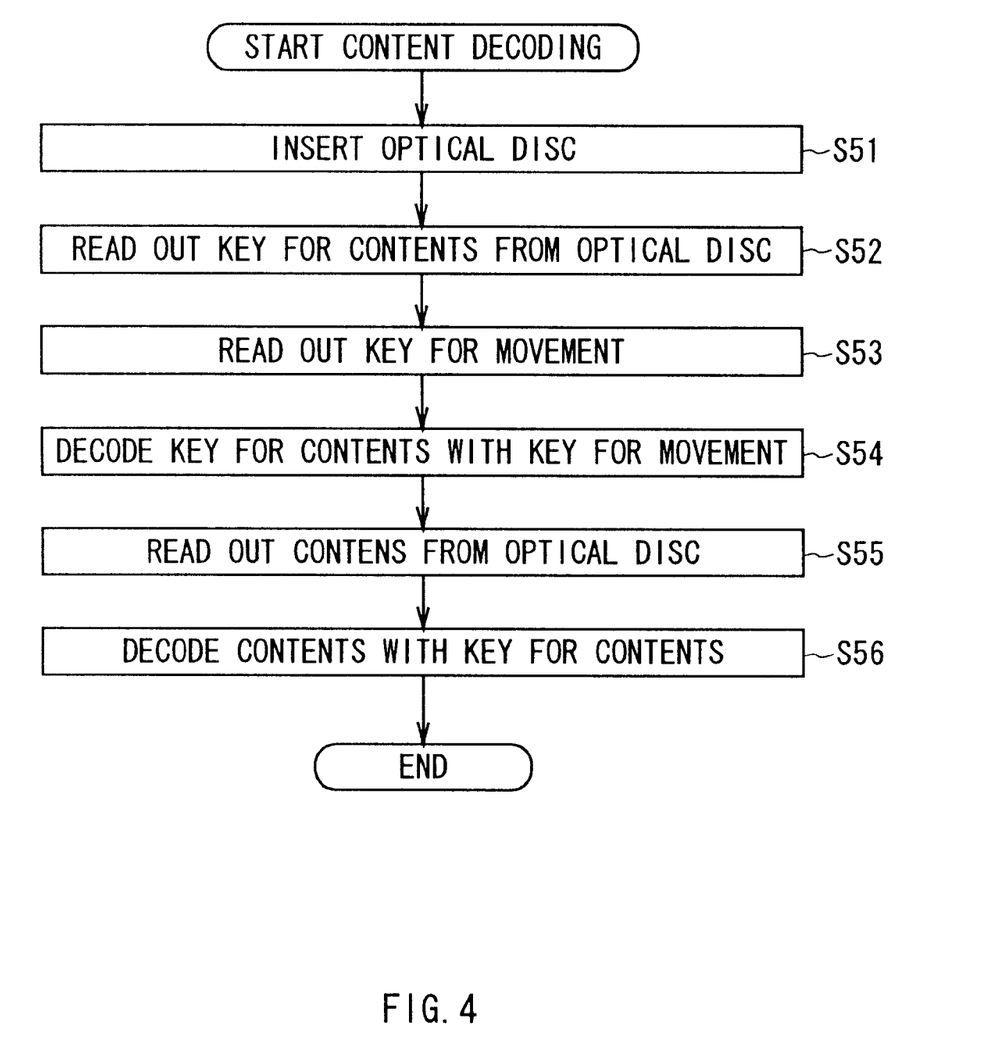
FIG. 4 is a flowchart explaining processing of decoding contents in a reading-out device 3.

FIG. 4 is a flowchart explaining the processing of decoding contents by the reading-out device 3. At step S51, the optical disc 5 recording contents coded with the key for contents Kcon and the key for contents Kcon coded with the key for movement Kt thereon is inserted into the reading-out part 31 of the reading-out device 3. At step S52, the reading-out part 31 reads out the key for contents Kcon, which has been coded with the key for movement Kt, from the inserted optical disc 5 and then supplies it to the decoding part 32. At step S53, the decoding part 32 reads out the key for movement Kt stored in the storing part 34. At step S54, the decoding part 32 decodes the key for contents Kcon with the key for movement Kt and supplies it to the decoding part 33. At step S55, the reading-out part 31 reads out contents, which has been coded with the key for contents Kcon, from the inserted optical disc 5, and then supplies it to the decoding part 33. At step S56, the decoding part 33 decodes the contents with the key for contents Kcon and the processing is completed.

In this way, the readout device 3 decodes contents recorded on the optical disc 5.

Figure 5:
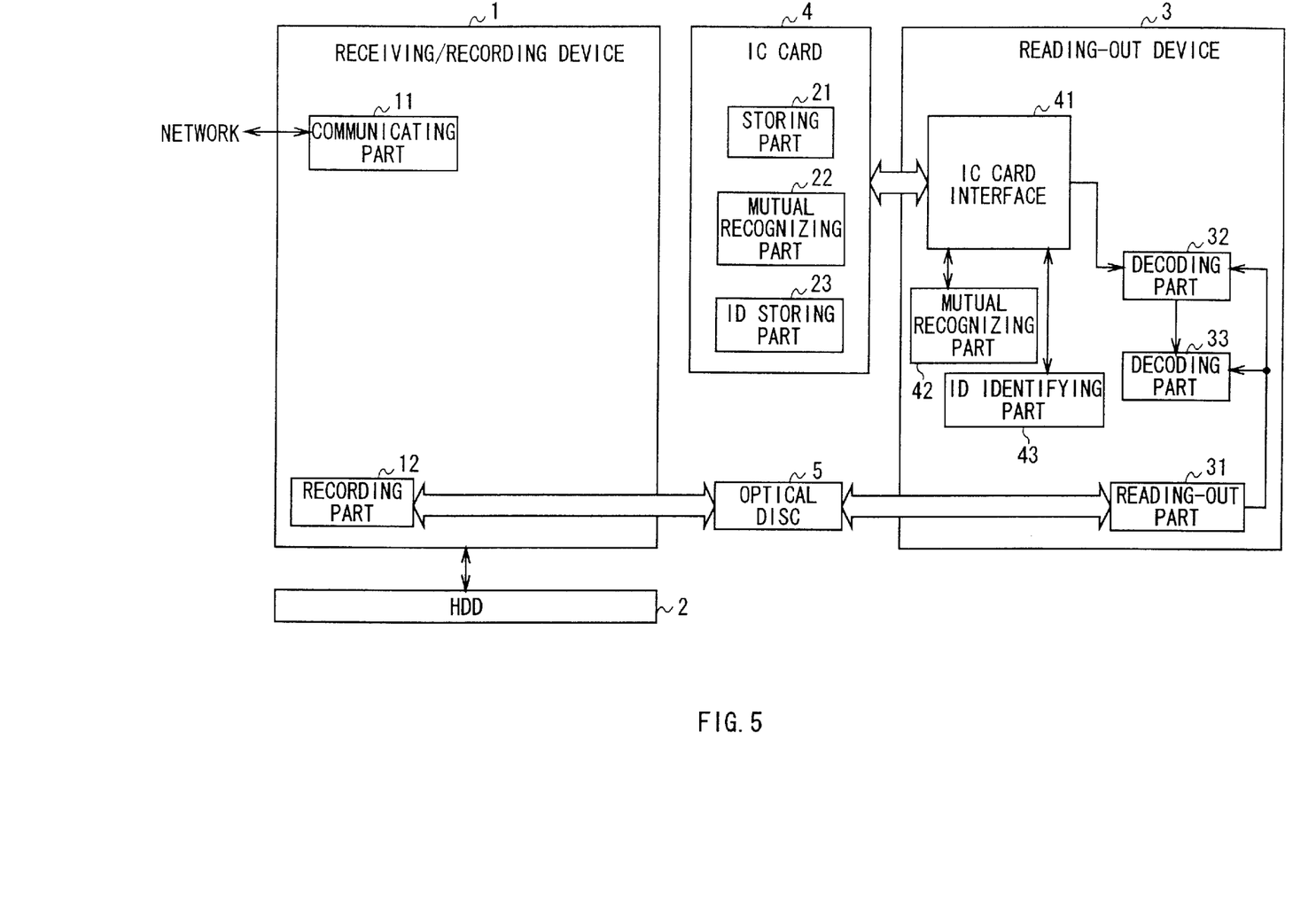
FIG. 5 is a block diagram explaining the configuration of the recording/read-out system.

FIG. 5 is a block diagram explaining the configuration of a recording/reading system other than the embodiment of the present invention. A receiving/recording device 1 shown in FIG. 5 has the configuration in which the storing part 13, the decoding part 14, the coding part 15, IC card interface 16, the mutual recognizing part 17, and the ID identifying part 18 are omitted from the receiving/recording device 1 shown in FIG. 1.

An IC card 4 shown in FIG. 5 has the same configuration as the IC card 4 shown in FIG. 1, however, the storing part 21 stores the key for storage Ks (it can be decoded) obtained by coding a key for contents Kcon.

A readout device 3 shown in FIG. 5 has the configuration in which the storing part 34 is omitted and an IC card interface 41, a mutual recognizing part 42, and an IC identifying part 43 are added with respect to the reading-out device 3 shown in FIG. 1. The IC card interface 41, the mutual recognizing part 42 and the IC identifying part 43 have the same functions as the IC card interface 16, the mutual recognizing part 17, and the IC identifying part 18 of the recording/recording device 1 shown in FIG. 1, respectively, so their explanations are omitted.

Figure 6:
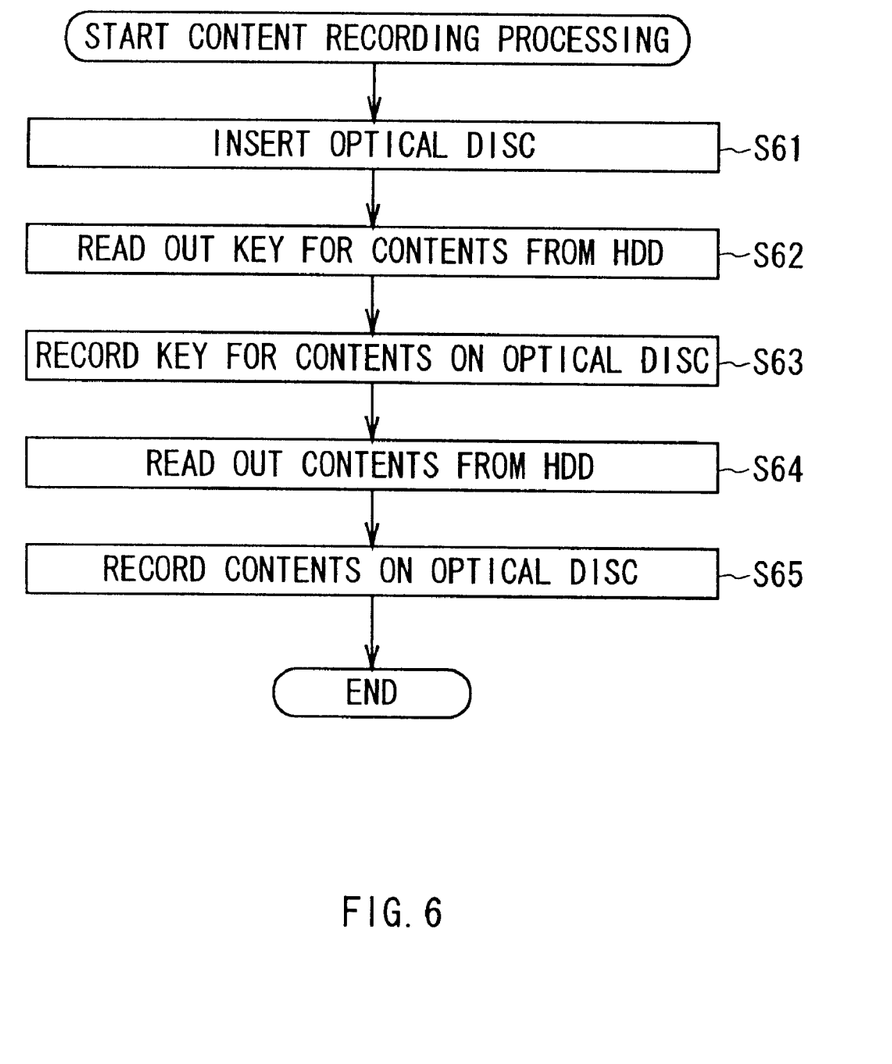
FIG. 6 is a flowchart explaining processing of recording contents and something being recorded in the HDD 2 on the optical disc 5 in the receiving/recording device 1 shown in FIG. 5.

Next, the processing of recording contents and so on, recorded in the HDD 2, on the optical disc 5 by the receiving/recording device 1 shown in FIG. 5 will be described with reference to a flowchart of FIG. 6. At step 61, the optical disc 5 is inserted into the recording part 12 of the receiving/recording device 1. At step S62, the recording part 12 reads out the key for contents Kcon coded with the key for storage Ks, from the HDD 2. At step S63, the recording part 12 records the coded key for contents Kcon on the optical disc 5. At step S64, the recording part 12 reads out contents, which has been coded with the key for contents Kcon. At step S65, the recording part 12 records the coded contents on the optical disc 5.

In this way, the receiving/recording device 1 shown in FIG. 5 records the coded contents and the key for contents Kc, which has been coded with the key for storage, on the optical disc 5.

Figure 7:
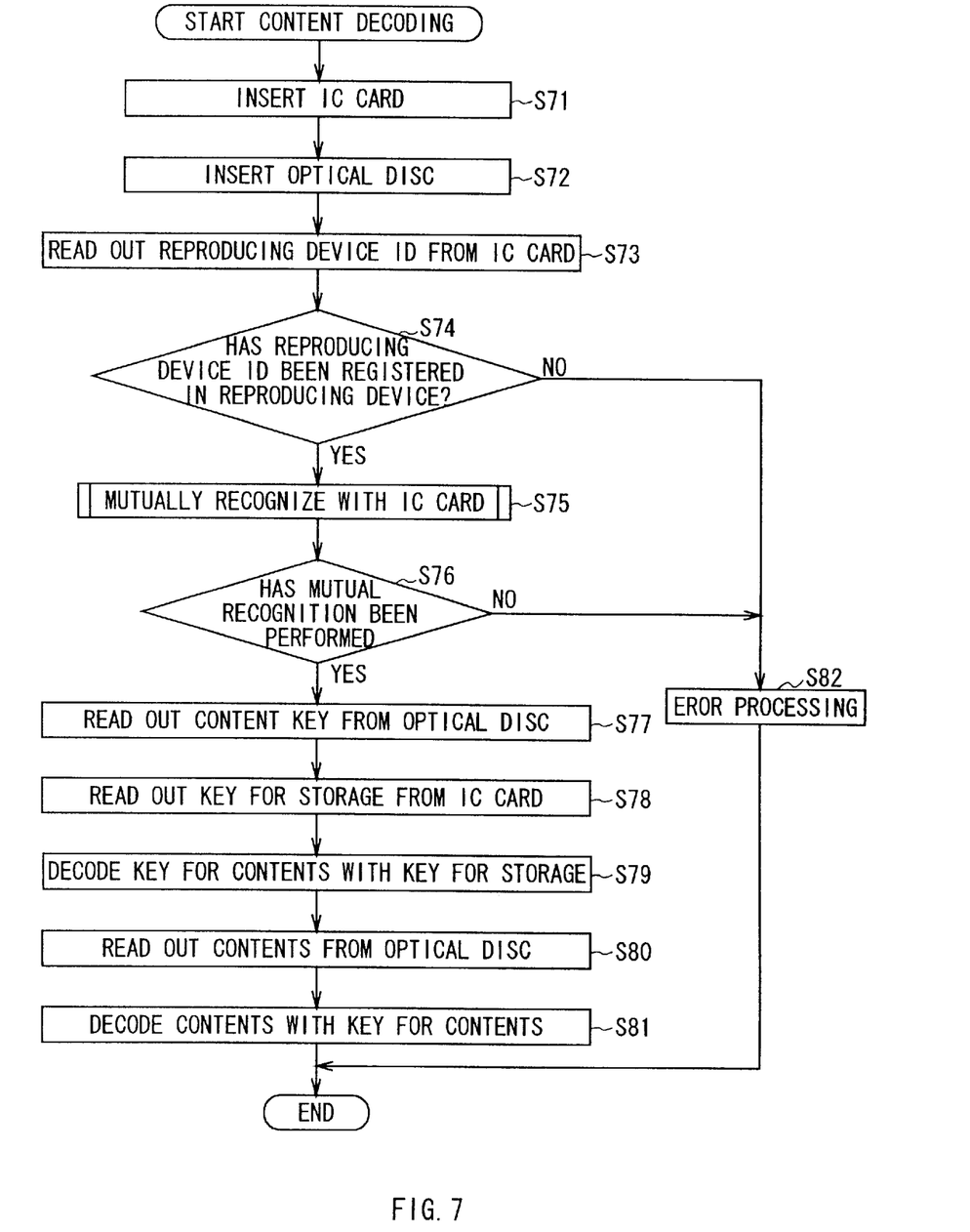
FIG. 7 is a flowchart explaining processing of decoding contents in the reading-out device 3 shown in FIG. 5.

In addition, the processing of decoding contents by the reading-out device 3 shown in FIG. 5 will be described with reference to the flowchart of FIG. 7. At step S71, the IC card 4 is inserted into the IC card interface 41 of the reading-out device 3. At step S72, the optical disc 5 is inserted into the reading-out part 31 of the reading-out device 3. At step S73, the IC identifying part 43 of the reading-out device 3 reads-out the ID of the reading-out device 3 stored in the ID storing part 23 of the IC card 4 through the IC card interface 41. At step S74, the ID identifying part 43 of the reading-out device 3 judges whether the ID, which has been read out from the ID storing part 23 of the IC card 4, has been registered with the ID identifying part 43. When it is judged that the ID has been registered with the ID identifying part 43, the processing proceeds to step S75 and the mutual recognizing part 42 mutually recognizes the mutual recognizing part 22 of the IC card 4. The procedure of the mutual recognition is the same as that of the flowchart of FIG. 3 in detail, so that the explanation is omitted.

At step S76, the mutual recognizing part 42 judges whether the mutual recognition is performed with the IC card 4 at step S75. When it is judged that the mutual recognition is performed with the IC card 4, the processing proceeds to step S77 and the reading-out part 31 reads out the key for contents Kcon coded with the key for storage Ks from the inserted optical disc 5 and supplies it to the decoding part 32. At step S78, the decoding part 32 reads out the key for storage Ks from the storing part 21 of the IC card 2 through the IC card interface 41. At step S79, the decoding part 32 decodes the key for contents Kcon with the key for storage Ks. At step S80, the reading-out part 31 reads out the contents coded with the key for contents Kcon, from the inserted optical disc 5 and supplies it to the decoding part 33. At step S81, the decoding part 33 decodes the contents with the key for contents Kcon and the processing is completed.

When it is judged at step S74 that the read ID has not been registered with the ID identifying part 43 and when it is judged at step S76 that the mutual recognition could not be performed with the IC card 4, the processing proceeds to step S82 and the ID identifying part 43 or the mutual recognizing part 42 executes the predetermined error processing such as displaying a predetermined error message on a display not shown, and then the processing is completed.

In this way, the readout device shown in FIG. 5 decodes contents recorded on the optical disc 5.

Figure 8:
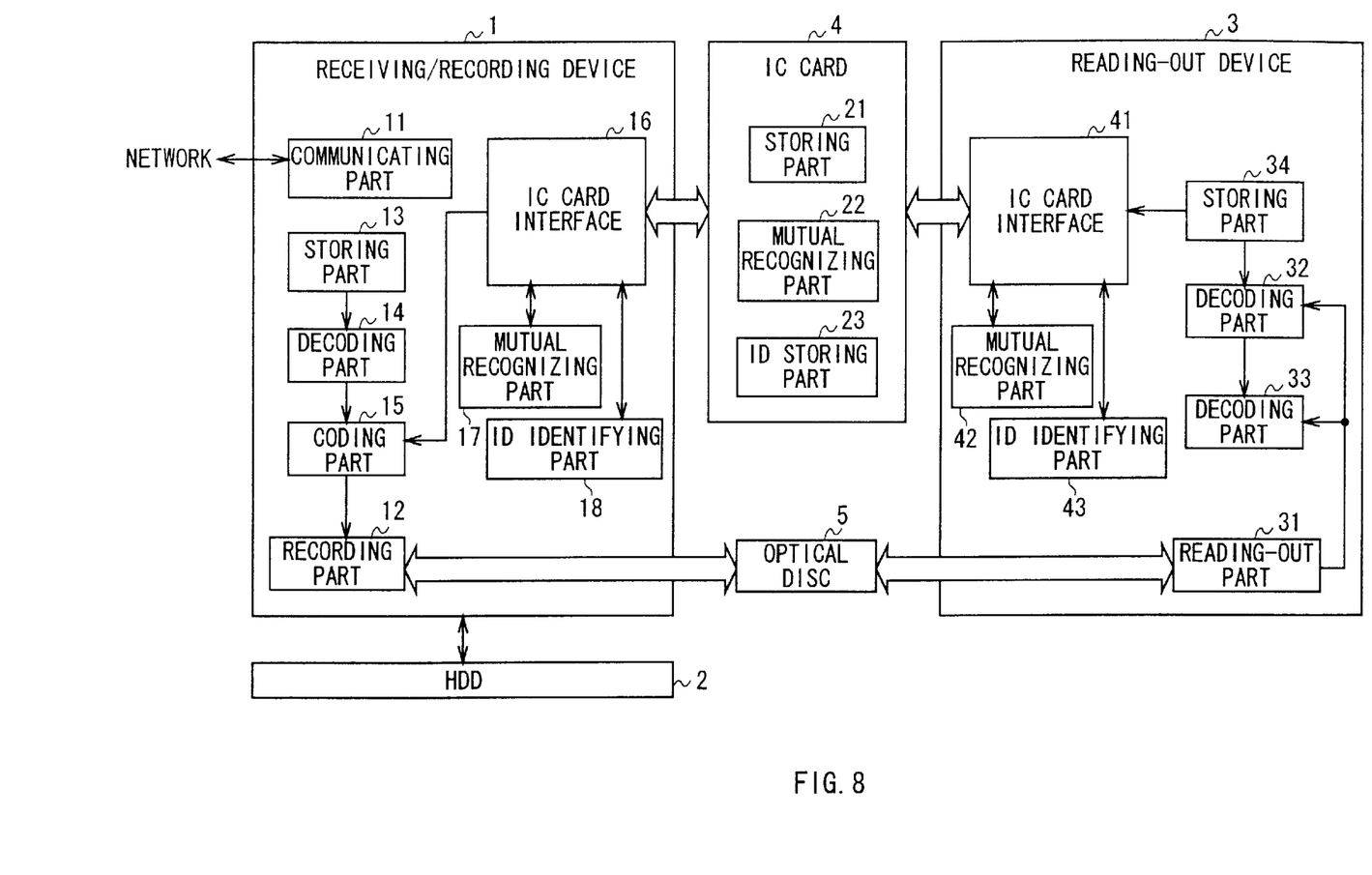
FIG. 8 is a block diagram explaining the configuration of the recording/read-out system.

FIG. 8 is a block diagram explaining the configuration of the readout system in the case where only the readout device 3 has a key for movement Kt. The receiving/recording device 1 shown in FIG. 8 has the same configuration as that shown in FIG. 1, so its explanation is omitted. The storing part 21 of the IC card 4 is composed of widely used non-volatile memories which can electrically rewrite stored contents, such as an EEPROM (Electrically Erasable Programmable Read Only Memory), a flash memory, a ferroelectric substance memory. And it stores the key for movement Kt which is used to code the key for contents Kcon when the IC card 4 is inserted into the readout device 3. The readout device 3 shown in FIG. 8 has the almost same configuration as that shown in FIG. 5, so its explanation is omitted. The IC card interface 41, the mutual recognizing part 41, and the ID identifying part 43 shown in FIG. 8 execute the same processing as those shown in FIG. 5. However, the storing part 34 execute the different processing from that shown in FIG. 5, in that the key for movement Kt stored in the storing part 34 is stored in the storing part 21 of the IC card 4.

The processing of storing a key for movement Kt in the IC card 4 in the readout device 3 shown in FIG. 8 will be described with reference to a flowchart in FIG. 9. At step S91, the IC card 4 is inserted into the IC card interface 41 of the reading-out device 3. At step S92, the ID identifying part 43 of the reading-out device 3 reads out the ID of the reading-out device 3 stored in the ID storing part 23 of the IC card 4 through the IC card interface 41. At step S93, the ID identifying part 43 of the reading-out device 3 judges whether the ID of the reading-out device 3 read out from the ID storing part 23 of the IC card 4 has been registered with the ID identifying part 43. When it is judged that the ID of the reading-out device 3 has been registered with the ID identifying part 43, the processing proceeds to step S94 and the mutual recognizing part 42 mutually recognizes the mutual recognizing part 22 of the IC card 4. The procedure of the mutual recognition is the same as the flowchart of FIG. 3, so its explanation is omitted.

At step S95, the mutual recognizing part 42 judges whether the mutual recognition is performed with the IC card 4 at step 94. When it is judged that the mutual recognition is performed with the IC card 4, the process proceeds to step S96 and the storing part 34 stores the key for movement Kt in the storing part 21 of the IC card 4 and the processing is completed.

When it is judged at step S93 that the read ID has not been registered with the ID identifying part 43 and when it is judged at step S95 that the mutual recognition is performed with the IC card 4, the process proceeds to step S97 and the ID identifying part 43 or the mutual recognizing part 42 executes the predetermined error processing such as displaying a predetermined error message on a display not shown and the processing is completed.

Through the above processing, the key for movement Kt is stored in the storing part 21 of the IC card 4. The procedure of recording coded contents on the optical disc 5 by the receiving/recording device 1 shown in FIG. 8 is the same as that explained with reference to the flowchart of FIG. 2. The procedure of decoding contents recorded on the optical disc 5 by the reading-out device shown in FIG. 8 is the same as that explained with reference to the flowchart of FIG. 4.

Figure 10:
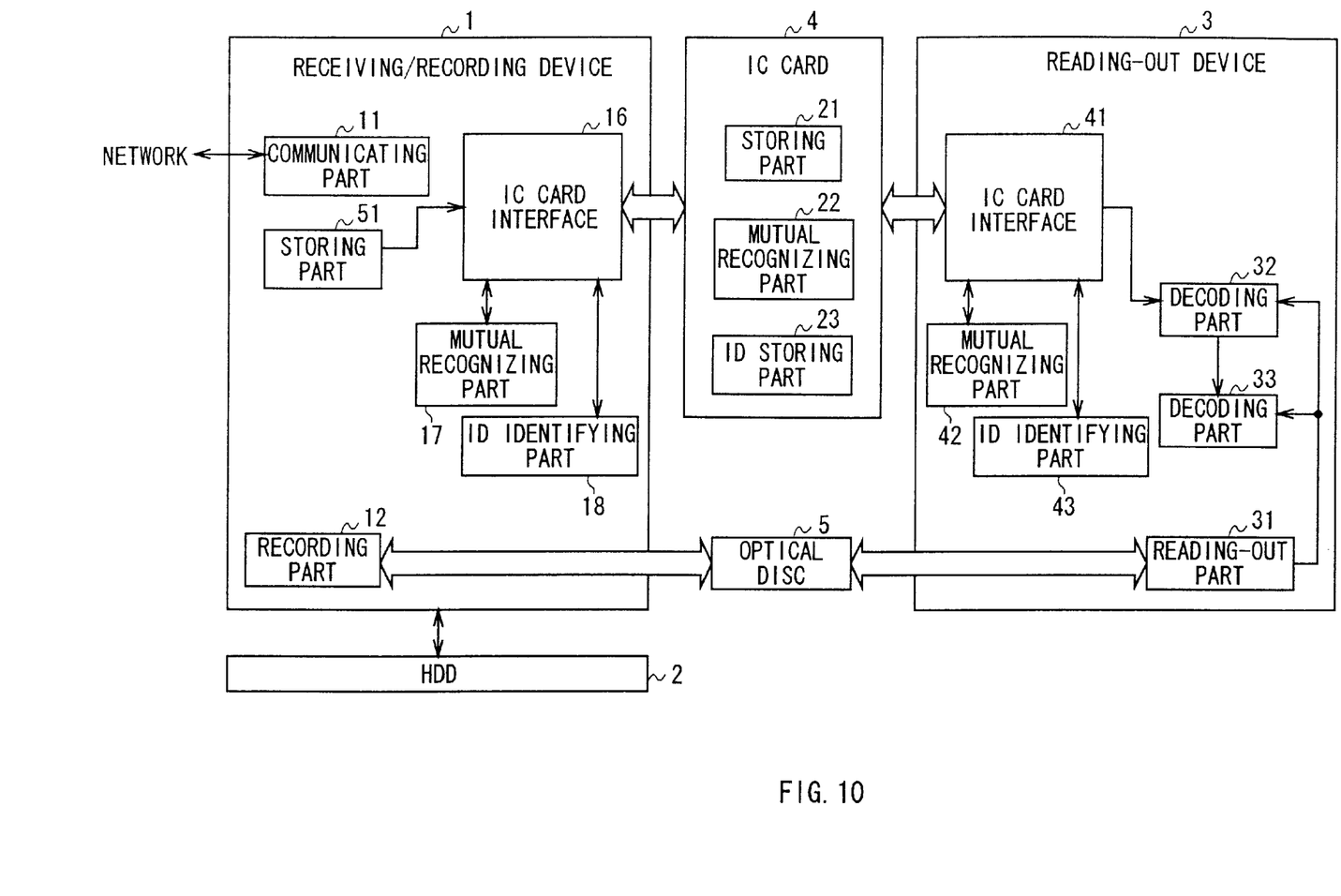
FIG. 10 is a block diagram explaining the configuration of the recording/read-out system.

FIG. 10 is a block diagram explaining the configuration of the recording/reading system in the case where only the receiving/recording device 1 has a key for storage KS. The readout device 3 shown in FIG. 10 is the same as that shown in FIG. 5, so its explanation is omitted. The IC card 4 shown in FIG. 10 is the same as that shown in FIG. 8, so its explanation is omitted. The receiving/recording device 1 shown in FIG. 10 has the configuration in which the decoding part 14 and the coding part 15 are omitted from the receiving/recording device 1 shown in FIG. 1. The storing part 51 of the receiving/recording device 1 shown in FIG. 10 stores the key for storage Ks (it can decode a key for contents Kcon) obtained by coding the key for contents Kcon, and supplies the key for storage Ks to the IC card interface 16.

Figure 9:
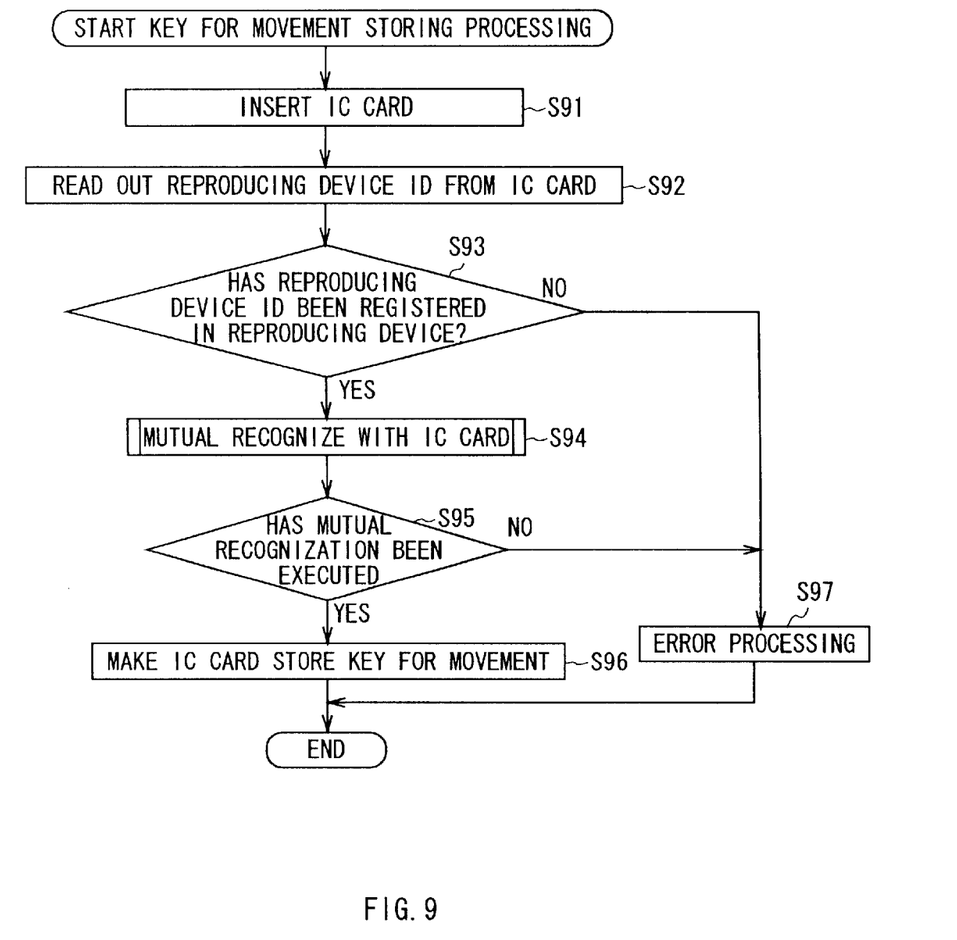
FIG. 9 is a flowchart explaining processing of making the IC card 4 store a key for movement Kt.

In the recording/reading-out system in FIG. 10, when the IC card 4 is inserted into the receiving/recording device 1, the key for storage Ks which is stored by the storing part 51 of the receiving/recording device 1 is stored in the IC card 4 through the same procedure as the flowchart of FIG. 9. The processing of recording coded contents on the optical disc 5 by the receiving/recording device 1 shown in FIG. 10 is the same as that explained with reference to the flowchart of FIG. 6. The processing of decoding contents recorded on the optical disc 5 by the reading-out device 3 shown in FIG. 10 is the same as that explained with reference to the flowchart of FIG. 7.

As described above, contents can be utilized by predetermined readout device with preventing them from being used dishonestly. Note that, this embodiment describes the IC card 4 as a medium for receiving/transmitting the key for movement Kt for coding a key for contents Kcon and the key for storage Ks between the receiving/recording device 1 and the reading-out device 3. However, the present invention is not limited thereto and a medium which has at least a mutual recognizing part and a storing part can be utilized.

Note that, the processing which is the common key-coding method, the DES, and uses two keys has been described. However, processing which is the DES and uses one key, processing using an FEAL and an IDEA (International Data Encryption Algorithm) which is proposed by NTT (trademark), or processing using open key coding such as a RAS (Rivest-Shamir-Adleman) coding can be also utilized.

Further, it has been described that contents are coded with the DES. However, the contents can be coded with another common key-coding method such as the FEAL and IDEA or the open key coding method such as the RAS.

It has been described that the coded contents and the coded key for contents Kcon are recorded on the optical disc 5. However, the recording medium such as a floppy disk, a MD (Mini Disk: trademark), and a magnetic tape can be used.

Further, it has been described that the error processing is performed and the processing is completed when the ID read out from the ID storing part 23 of the IC card 4 has not been registered with the ID identifying part 18 or in the ID identifying part 43. However, the processing can be performed in which the dishonest ID is stored in the ID identifying part 18 or the ID identifying part 43, and the error processing is performed and then the processing is completed also when the same Id as that dishonest ID is read out from the ID storing part 23 of the IC card 4.

Note that, in this description, the system means the whole system composed of multiple devices.

Further, a communicating medium such as a network and a satellite in addition to a recording medium such as a magnetic disk, a CD-ROM, and a solid memory can be utilized as the providing medium which provides computer programs for above processing to a user.

In the recording device according to the present invention, the recording method according to the present invention, and the providing medium according to the present invention each mutually recognizes an information storing medium, codes a first key with a second key, and records coded information and the coded first key in a recording medium, so that coded information can be treated by devices other than a device supplied with the information, with avoiding dishonest utilization.

The decoding device according to the present invention, the decoding method according to the present invention, and the providing medium according to the present invention each decodes a key read out from a recording medium, and decodes coded information with the decoded key, so that coded information can be treated by devices other than a device supplied with the information, with avoiding dishonest utilization.

The information storing medium according to the present invention mutually recognizes the recording device or the decoding device and also stores a second key for coding or decoding a first key which is used to decode coded information, so that coded information can be treated by devices other than a device supplied with the information, with avoiding dishonest utilization.

Industrial Applicability

The present invention is utilized to an information providing system which codes and provides information such as music to registered multiple users from an information provider through an information transmission circuit.

What is claimed is:

1. A recording device for receiving coded information coded using a third key and for recording said coded information in an inserted removable recording medium, the recording device having an inserted removable information storing medium for storing a second key, comprising:

mutual recognition means for identifying said information storing medium by comparing respective identification codes;

decoding means for decoding said third key with a first key stored in said recording device;

coding means for coding said third key using said second key read from said information storing medium based on a positive identification by said mutual recognition means; and recording means for recording said coded information coded using said third key and said third key coded using said second key by said coding means in said recording medium.

2. The recording device according to claim 1, wherein:

said information storing medium stores data specifying a readout device which reads information recorded in said recording medium; and said recording device further comprises identifying means for identifying data specifying said readout device.

3. A recording method for receiving coded information coded using a third key and for recording said coded information in an inserted removable recording medium and having an inserted removable information storing medium for storing a second key, the method comprising:

a mutual recognition step of identifying said information storing medium by comparing respective identification codes;

a decoding step of decoding said third key with a first key;

a coding step of coding said third key using said second key read from said information storing medium based on a positive identification in said mutual recognition step; and a recording step of recording said coded information coded using said third key and said third key coded using said second key by said coding step in said recording medium.

4. A providing medium for providing programs which can be read by a computer, said computer instructing a recording device for receiving coded information coded using a third key and recording said coded information in an inserted removable recording medium, the recording device having an inserted removable information storing medium for storing a second key to execute processing, said processing comprising:

a mutual recognition step of identifying said information storing medium by comparing respective identification codes;

a decoding step of decoding said third key with a first key;

a coding step of coding said third key using said second key read from said information storing medium based on a positive identification in said mutual recognition step; and a recording step of recording said coded information coded using said third key and said third key coded using said second key by said coding step in said recording medium.

5. A decoding device, into which an inserted removable recording medium having coded information coded using a third key and said third key coded using a second key recorded therein, for reading out said second key for decoding said third key from an inserted removable information storing medium and for decoding said coded information, comprising:

mutual recognition means for identifying said information storing medium by comparing respective identification codes; and decoding means for decoding said third key coded using said second key with said second key stored in said information storing medium based on a positive identification by said mutual recognition means and decoding said coded information using said third key.

6. A decoding method, utilizing a decoding device, into which is inserted a removable recording medium having recorded thereon coded information coded using a third key and said third key coded using a second key, for reading out said second key for decoding said third key from an inserted removable information storing medium and for decoding said coded information, comprising:

a mutual recognition step of identifying said information storing medium by comparing respective identification codes; and a decoding step of decoding said third key coded using said second key with said second key stored in said information storing medium based on a positive identification in said mutual recognition step and decoding said coded information using said third key.

7. A providing medium for providing programs, which can be read by a computer, said computer instructing a decoding device into which an inserted removable recording medium having recorded thereon coded information coded using a third key and said third key coded using a second key is inserted, and for reading out said second key for decoding said third key from an inserted removable information storing medium and for decoding said coded information, to execute processing, said processing comprising:

a mutual recognizing step of identifying said information storing medium by comparing respective identification codes; and a decoding step of decoding said third key coded using said second key with said second key stored in said information storing medium based on a positive identification in said mutual recognition step and decoding said coded information using said third key.

8. An information storing medium inserted into a recording device for recording coded information coded using a third key and said third key coded using a second key in a recording medium and a decoding device for decoding said coded information recorded in said recording medium, comprising:

mutual recognition means for mutually recognizing one of said recording device and said decoding device by comparing respective identification codes; and storing means for storing said second key for one of coding and decoding said third key coded using said second key.

9. The information storing medium according to claim 8, further comprising:

second storing means for storing data specifying a decoding device which decodes information recorded in said recording medium.

10. The information storing medium according to claim 8, wherein said second key is supplied from said recording device.

11. The information storing medium according to claim 8, wherein said second key is supplied from said decoding device.

* * * * *